United States Patent
Henrion et al.

(10) Patent No.: US 12,208,885 B2
(45) Date of Patent: Jan. 28, 2025

(54) MEASURING THE PRESSURE IN THE EXPANSION CHAMBER OF AN ENCAPSULATED SHOCK ABSORBER IN AN AIRCRAFT LANDING GEAR

(71) Applicant: SAFRAN LANDING SYSTEMS, Vélizy-Villacoublay (FR)

(72) Inventors: Philippe Henrion, Moissy-Cramayel (FR); Arnaud Lafitte, Moissy-Cramayel (FR)

(73) Assignee: SAFRAN LANDING SYSTEMS, Vélizy-Villacoublay (FR)

( * ) Notice: Subject to any disclaimer, the term of this patent is extended or adjusted under 35 U.S.C. 154(b) by 365 days.

(21) Appl. No.: 17/904,769

(22) PCT Filed: Feb. 26, 2021

(86) PCT No.: PCT/EP2021/054807
§ 371 (c)(1),
(2) Date: Aug. 22, 2022

(87) PCT Pub. No.: WO2021/170788
PCT Pub. Date: Sep. 2, 2021

(65) Prior Publication Data
US 2023/0038683 A1  Feb. 9, 2023

(30) Foreign Application Priority Data
Feb. 26, 2020 (FR) ........................................ 2001918

(51) Int. Cl.
*B64C 25/60* (2006.01)
*F16F 9/06* (2006.01)
(Continued)

(52) U.S. Cl.
CPC .............. *B64C 25/60* (2013.01); *F16F 9/063* (2013.01); *F16F 9/3292* (2013.01); *G01L 19/0007* (2013.01)

(58) Field of Classification Search
CPC .......... F16F 9/3292; F16F 9/063; B64C 25/60
See application file for complete search history.

(56) References Cited

U.S. PATENT DOCUMENTS 2,165,465 A * 7/1939 Ehrhardt ................. B64C 25/22
244/102 R
4,141,236 A * 2/1979 Ellington .............. F16F 9/3292
73/11.04
(Continued)

FOREIGN PATENT DOCUMENTS

DE 102008054573 A1 * 6/2010 ............ F16F 9/3292
FR 2 608 242 A1  6/1988
FR 2 917 371 A1  12/2008

OTHER PUBLICATIONS

International Search Report mailed Apr. 30, 2021, issued in corresponding International Application No. PCT/EP2021/054807, filed Feb. 26, 2021, 5 pages.
(Continued)

*Primary Examiner* — Herbert K Roberts
(74) *Attorney, Agent, or Firm* — CHRISTENSEN O'CONNOR JOHNSON KINDNESS PLLC

(57) ABSTRACT

An encapsulated shock absorber of an aircraft undercarriage includes a sliding rod slidably mounted in a leg strut of the undercarriage and an inner cylinder extending inside the strut. The inner cylinder is fastened to the strut via a top end, and the rod slides around the inner cylinder. The inner cylinder is terminated inside the sliding rod by a diaphragm that defines an oil chamber in the shock absorber and inside the sliding rod. A mixed oil/gas chamber is located in the inner cylinder, and an expansion chamber extends between
(Continued)

the sliding rod and the inner cylinder. A hole being made in the inner cylinder in register with the expansion chamber is connected by a pipe to a pressure sensor situated outside the strut. The pipe extends inside the inner cylinder from the hole to the top end of the inner cylinder.

8 Claims, 3 Drawing Sheets

(51) Int. Cl.
*F16F 9/32* (2006.01)
*G01L 19/00* (2006.01)

(56) References Cited

U.S. PATENT DOCUMENTS

| | | | |
|---|---|---|---|
| 5,004,215 A * | 4/1991 | Aubry | F16F 13/18 180/312 |
| 2005/0211831 A1 * | 9/2005 | Courtois | F16F 9/064 244/102 R |
| 2006/0220917 A1 | 10/2006 | Nance | |
| 2012/0305347 A1 * | 12/2012 | Mori | B60G 17/08 188/266.2 |
| 2016/0236796 A1 * | 8/2016 | Piroozmandi | B64C 25/60 |
| 2016/0272309 A1 | 9/2016 | Schmidt | |
| 2017/0130796 A1 * | 5/2017 | Fazeli | B64C 25/58 |
| 2019/0016319 A1 * | 1/2019 | Thompson | B64C 25/34 |
| 2019/0177009 A1 * | 6/2019 | Brown | F16F 9/3271 |
| 2019/0376576 A1 * | 12/2019 | Fazeli | F16F 9/3271 |
| 2020/0249129 A1 * | 8/2020 | Fazeli | F16F 9/3292 |
| 2021/0101434 A1 * | 4/2021 | Sawarynski, Jr. | B60G 17/0152 |
| 2022/0169292 A1 * | 6/2022 | Lizell | F16F 9/084 |

OTHER PUBLICATIONS

Written Opinion mailed Apr. 30, 2021, issued in corresponding International Application No. PCT/EP2021/054807, filed Feb. 26, 2021, 6 pages.
English translation of Written Opinion mailed Apr. 30, 2021, issued in corresponding International Application No. PCT/EP2021/054807, filed Feb. 26, 2021, 6 pages.
International Preliminary Report on Patentability mailed Aug. 30, 2022, issued in corresponding International Application No. PCT/EP2021/054807, filed Feb. 26, 2021, 7 pages.

* cited by examiner

MEASURING THE PRESSURE IN THE EXPANSION CHAMBER OF AN ENCAPSULATED SHOCK ABSORBER IN AN AIRCRAFT LANDING GEAR

BACKGROUND OF THE INVENTION

In certain circumstances, and in particular during flight testing, it is useful to know the pressure that exists in each of the chambers of an undercarriage shock absorber, and in particular in its expansion chamber. In direct type undercarriages in which the leg strut forms the outer cylinder of the shock absorber, the expansion chamber is organized between the strut and the sliding rod that carries the wheels and that slides inside the strut, such that the pressure in the expansion chamber can be measured merely by means of a hole arranged through the wall of the strut into the expansion chamber, and by fitting a pressure sensor on the wall, in register with said hole. This modification is very simple and does not require any modification to the structure of the undercarriage.

The same does not apply to undercarriages having an encapsulated shock absorber, in which the outer cylinder of the shock absorber is formed by the wheel-carrying sliding rod that that slides inside the strut. The expansion chamber is then arranged between the sliding rod and an inner cylinder that extends inside the strut, and the strut is not subjected to the pressures that exist in the shock absorber. By way of example, such an arrangement is used for the nosewheels of Airbus type A320 airplanes. It is then no longer possible to measure the pressure in the expansion chamber through a hole in the wall of the strut.

OBJECT OF THE INVENTION

The invention seeks to measure the pressure in the expansion chamber of an encapsulated shock absorber in an aircraft undercarriage.

SUMMARY OF THE INVENTION

In order to achieve this object, there is provided a method of measuring pressure in an encapsulated shock absorber of an aircraft undercarriage, the shock absorber comprising a sliding rod slidably mounted in a leg strut of the undercarriage and an inner cylinder extending inside the strut, the inner cylinder being fastened to the strut via a top end and the sliding rod sliding around the inner cylinder, the inner cylinder being terminated inside the sliding rod by a diaphragm that defines an oil chamber in the shock absorber and inside the sliding rod, a mixed oil/gas chamber in the inner cylinder, and an expansion chamber extending between the sliding rod and the inner cylinder, the method comprising the step of making a hole in the inner cylinder in register with the expansion chamber, and in using a pipe to connect the hole to a pressure sensor situated outside the strut in order to measure pressure in the expansion chamber, the pipe extending inside the inner cylinder from the hole to the top end of the inner cylinder.

Thus, the pressure in the expansion chamber is taken up to the top of the strut by passing through the inner cylinder, thereby enabling that pressure to be monitored without major modification to the shock absorber or to the undercarriage.

Preferably, the pipe is caused to open out via an orifice in the top end of the inner cylinder that is used for inflating the shock absorber, by fitting the orifice with a hydraulic block adapted to receive both a pressure sensor and an inflation valve.

The invention also provides an aircraft undercarriage having an encapsulated shock absorber, the shock absorber comprising a sliding rod slidably mounted in a leg strut of the undercarriage and an inner cylinder extending inside the strut, the inner cylinder being fastened to the strut via a top end and the sliding rod sliding around the inner cylinder, the inner cylinder being terminated inside the sliding rod by a diaphragm that defines an oil chamber in the shock absorber and inside the sliding rod, a mixed oil/gas chamber in the inner cylinder, and an expansion chamber extending between the sliding rod and the inner cylinder. A hole is made in the inner cylinder in register with the expansion chamber, and a pipe connects the hole to a pressure sensor situated outside the strut in order to measure pressure in the expansion chamber, the pipe extending inside the inner cylinder from the hole to the top end of the inner cylinder.

DESCRIPTION OF THE FIGURES

The invention can be better understood in the light of the following description of a particular embodiment of the invention, given with reference to the figures of the accompanying drawings, in which.

DETAILED DESCRIPTION OF THE INVENTION

Figure 1:
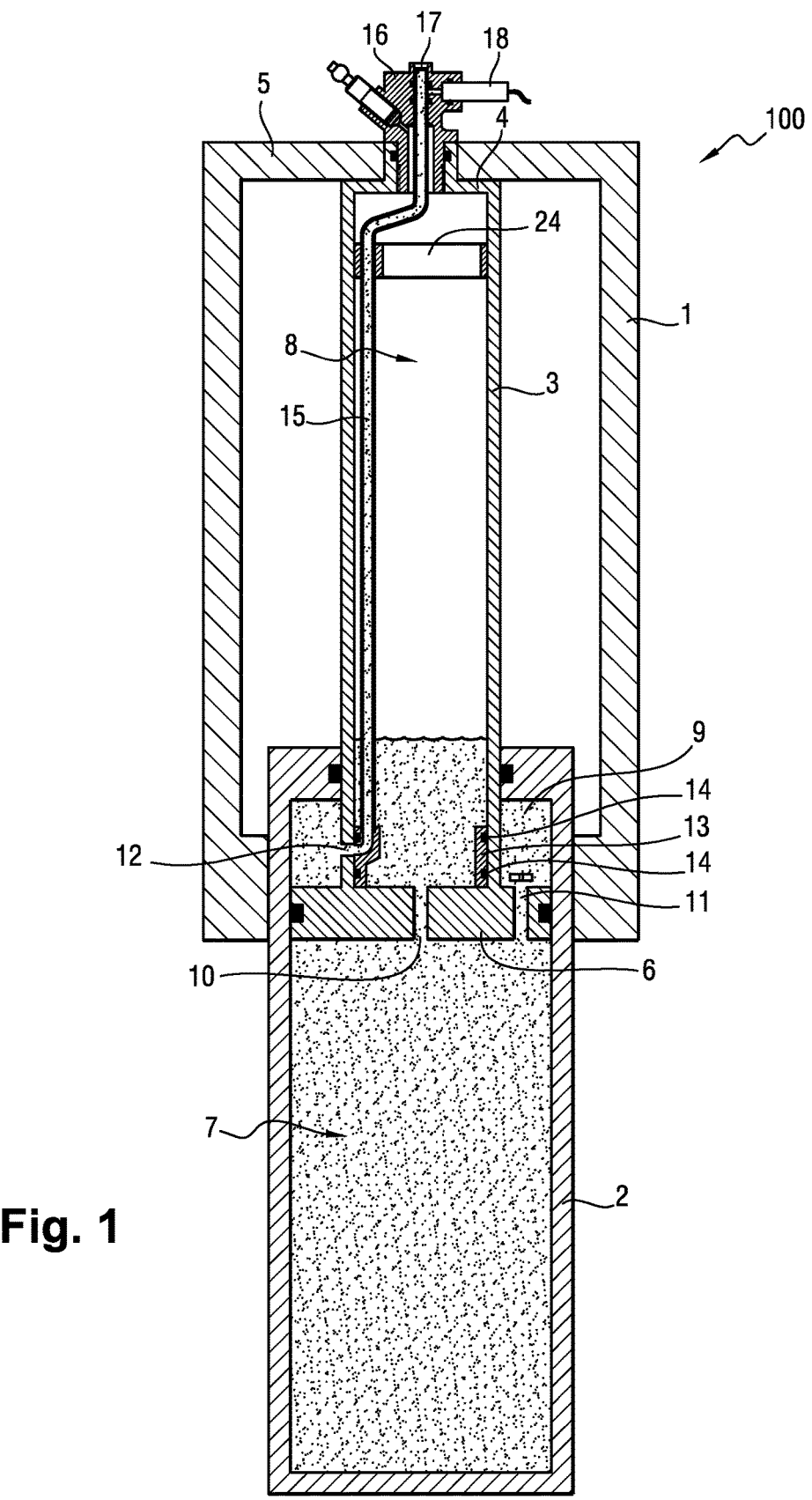
FIG. 1 is a diagrammatic section view of an undercarriage of the invention having an encapsulated shock absorber.

With reference to FIG. 1, the invention applies to an aircraft undercarriage 100 having a leg strut 1 connected to the structure of the aircraft. In general, the strut 1 is hinged-mounted to move between a deployed position, as shown, and a retracted position in which the undercarriage is received in a well in the aircraft. A sliding rod 2 is slidably mounted inside the strut 1 and has a bottom end projecting therefrom. The sliding rod 2 carries one or more wheels (not shown) at its bottom end.

In this example, an inner cylinder 3 extending inside the strut 1 is slidably engaged in the sliding rod 2 in leaktight manner so as to co-operate therewith to form a shock absorber. The inner cylinder 3 has a top end 4 fastened to a top end wall 5 of the strut, and a bottom end provided with a diaphragm 6 that defines within the shock absorber as constituted in this way:

- an oil chamber 7 extending inside the sliding rod 2 and filled with hydraulic fluid;
- a mixed oil/gas chamber 8 extending inside the inner cylinder 3 and containing gas under pressure, e.g. nitrogen, which chamber 8 may potentially also contain hydraulic fluid coming from the oil chamber 7 since the shock absorber 100 in this example does not have a separator keeping the hydraulic fluid and the gas separate; and
- an expansion chamber 9 extending between the sliding rod 2 and the inner cylinder 3, which chamber is annular in shape and is likewise filled with hydraulic fluid.

The diaphragm 6 has a first calibrated orifice 10 allowing hydraulic fluid to pass between the oil chamber 7 and the mixed oil/gas chamber 8, and a second orifice with a calibrated check valve 11 allowing hydraulic fluid to pass between the oil chamber 7 and the expansion chamber 9, so as to allow fluid to enter the expansion chamber 9 with little resistance, while opposing appreciable resistance to fluid leaving the expansion chamber 9.

This configuration is referred to as an "encapsulated" shock absorber, since the shock absorber assembly is fastened to the strut via the top end of the inner cylinder, with the strut itself not being subjected to the pressure inside the shock absorber.

The encapsulated shock absorber operates as follows. On landing, the sliding rod 2 is pushed into the strut 1, thereby causing hydraulic fluid to be transferred from the oil chamber 7 to the mixed oil/gas chamber 8 against the pressure exerted by the gas occupying the mixed oil/gas chamber 8. Fluid passing through the calibrated first orifice 10 generates resistance to the sliding rod 2 being pushed in. At the same time, some of the hydraulic fluid expelled from the oil chamber 7 passes via the second orifice 11 to fill the expansion chamber 9, causing its volume to increase.

On takeoff, the wheels are suddenly released from the weight of the aircraft. The pressure generated by the gas pushes hydraulic fluid out from the mixed oil/gas chamber 8 into the oil chamber 7, forcing the sliding rod 2 towards its extended position, while the fluid contained in the expansion chamber 9 also penetrates into the oil chamber 7 via the calibrated check valve of the second orifice 11 at a controlled rate that serves to govern the travel speed of the sliding rod 2, thereby preventing it from stopping violently in the extended position.

This is all well known, and is recalled merely to situate the context of the invention.

Figure 2:
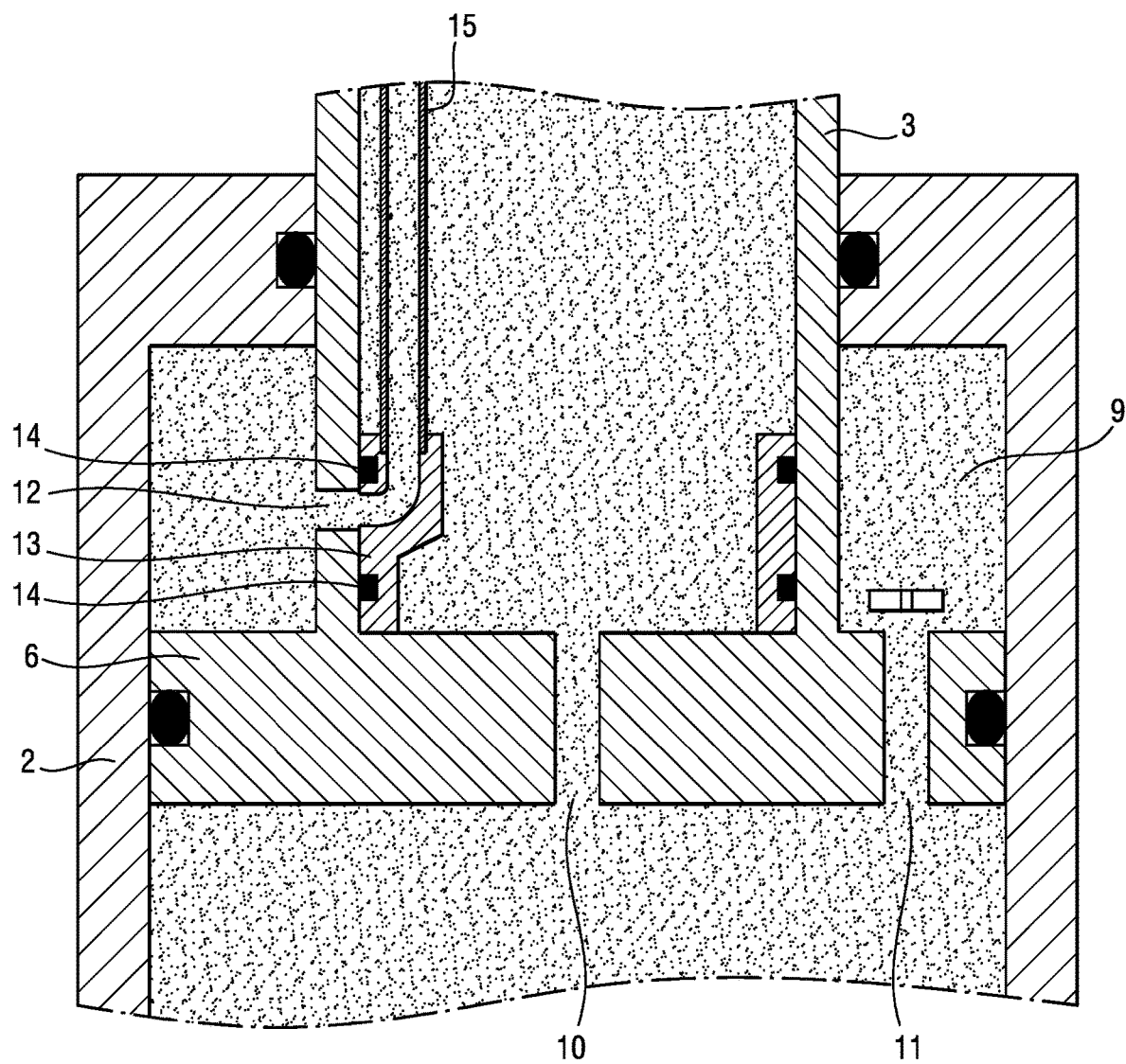
FIG. 2 is a detail view of the inner cylinder of the FIG. 1 shock absorber showing its diaphragm.

According to the invention, a hole 12 is made in the wall of the inner cylinder 3 in register with the expansion chamber 9. As can be seen more particularly in FIG. 2, the hole 12 in this example is made a little above the diaphragm 6, which in this example has fitted thereon a skirt 13 with two sealing rings 14 extending on either side of the hole in order to cooperate with the inside wall of the inner cylinder. The skirt 13 includes a port opening out between the two sealing rings 14 in order to receive the end of a rigid pipe 15 that extends inside the inner cylinder 3 to a hydraulic block 16 that is fastened in leaktight manner to the top of the inner cylinder 3 at its orifice that is usually used for inflating it.

Figure 3:
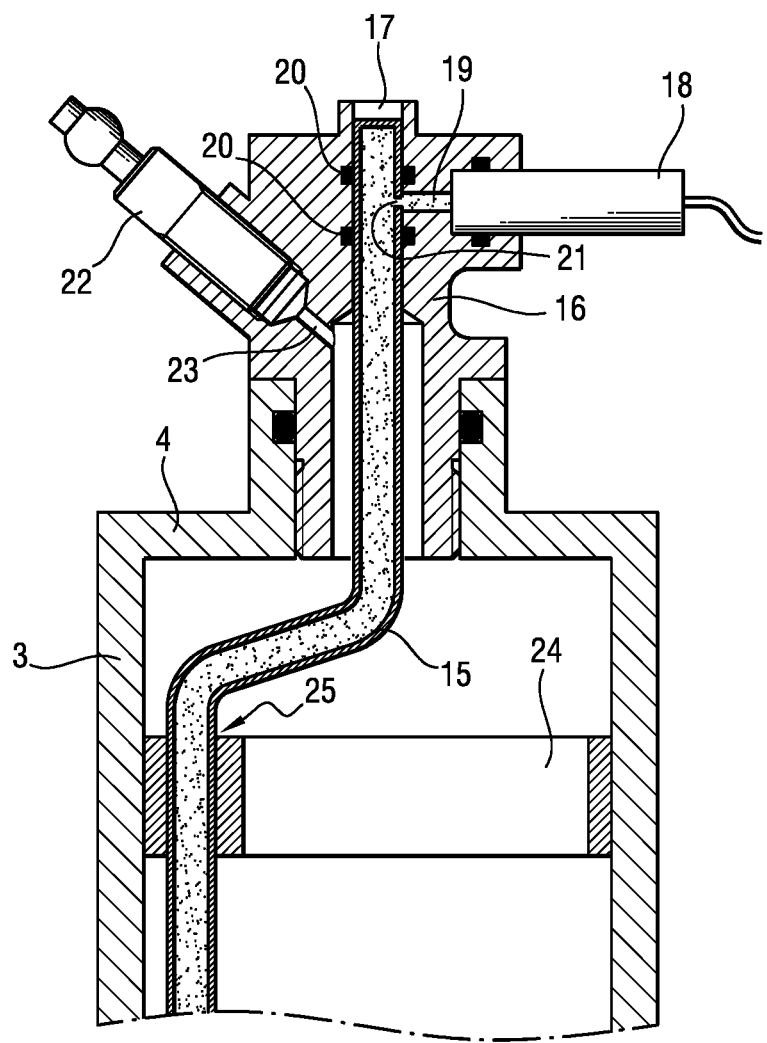
FIG. 3 is a detail view of the top of the inner cylinder of the FIG. 1 shock absorber fitted with a hydraulic block in accordance with the invention.

As can be seen more particularly in FIG. 3, the top end of the pipe 15 is engaged in leaktight manner in a bore 17 of the hydraulic block 16. The hydraulic block 16 carries a pressure sensor 18 that is screwed in leaktight manner in a channel 19 leading into the bore 17 between two sealing rings 20 that co-operate with the pipe 15 and having between them an orifice 21 passing through the wall of the pipe 15. Thus, the pressure sensor 18 is put into fluid flow communication with the expansion chamber 9 via the pipe 15. In this example, the hydraulic block 16 carries an inflation valve 22 that is screwed in leaktight manner to a channel 23 leading into the bore 17 below the sealing gaskets 20 so as to be in communication with the inside of the inner cylinder 3 in order to enable it to be inflated with nitrogen.

The pipe 15 is held along the inside wall of the inner cylinder 3 by an annular support 24, in this example made of plastics material and fitted against the inside wall of the inner cylinder 3, the support including a passage 25 for receiving the pipe 15. This configuration avoids any risk of the pipe 15 colliding with any potential throttling needle (not shown) that might be secured to the sliding rod 2 so as to pass through the diaphragm 6 in order to project into the inner cylinder 3.

Thus, at the cost of very minor modifications (drilling the inner cylinder in register with the expansion chamber, fitting a skirt on the diaphragm, and placing a-small-hydraulic block on the top of the inner cylinder to receive a pressure sensor), the invention makes it possible to measure the pressure in the expansion chamber.

The invention is not limited to the above description, but on the contrary covers any variant coming within the ambit defined by the claims.

In particular, although above the pipe is described as opening out into a hydraulic block carrying both the pressure sensor and an inflation valve, thus making it possible to avoid modifying the top end of the bottle, the pipe could exit via a specific hole in the top end.

The diaphragm 6 could be arranged differently.

Any suitable means could be used for fastening the pipe 15 along the inner cylinder 3.

The invention claimed is:

1. A method of measuring pressure in a shock absorber of an aircraft undercarriage having an encapsulated shock absorber, the shock absorber comprising a sliding rod slidably mounted in a leg strut of the undercarriage and an inner cylinder extending inside the strut, the inner cylinder being fastened to the strut via a top end and the sliding rod sliding around the inner cylinder, the inner cylinder being terminated inside the sliding rod by a diaphragm that defines an oil chamber in the shock absorber and inside the sliding rod, a mixed oil/gas chamber in the inner cylinder, and an expansion chamber extending between the sliding rod and the inner cylinder, the method comprising the steps of making a hole in the inner cylinder in register with the expansion chamber, and using a pipe to connect the hole to a pressure sensor situated outside the strut in order to measure pressure in the expansion chamber, the pipe extending inside the inner cylinder from the hole to the top end of the inner cylinder.

2. The method according to claim 1, wherein the pipe is caused to open out via an orifice in the top end of the inner cylinder that is used for inflating the shock absorber, by fitting the orifice with a hydraulic block configured to receive both the pressure sensor and an inflation valve.

3. The method according to claim 1, wherein the diaphragm is fitted with a skirt having two sealing rings cooperating with an inside wall of the inner cylinder on either side of the hole, the pipe being connected to a port of the skirt that opens out between the sealing rings.

4. The method according to claim 1, wherein the pipe is held along an inside wall of the inner cylinder by means of an annular support fitted against the inside wall of the inner cylinder and including a passage configured to receive the pipe.

5. An aircraft undercarriage having an encapsulated shock absorber, the shock absorber comprising a sliding rod slidably mounted in a leg strut of the undercarriage and an inner cylinder extending inside the strut, the inner cylinder being fastened to the strut via a top end and the sliding rod sliding around the inner cylinder, the inner cylinder being terminated inside the sliding rod by a diaphragm that defines an oil chamber in the shock absorber and inside the sliding rod, a mixed oil/gas chamber in the inner cylinder, and an expansion chamber extending between the sliding rod and the inner cylinder, wherein a hole is made in the inner cylinder in register with the expansion chamber, and a pipe connects the hole to a pressure sensor situated outside the strut in order to measure pressure in the expansion chamber, the pipe extending inside the inner cylinder from the hole to the top end of the inner cylinder.

6. The undercarriage according to claim 5, wherein the pipe opens out in the top end of the inner cylinder via an orifice that is used for inflating the shock absorber, the orifice being fitted with a hydraulic block configured to receive both the pressure sensor and an inflation valve.

7. The undercarriage according to claim 5, wherein the diaphragm is fitted with a skirt having two sealing rings cooperating with an inside wall of the inner cylinder on either side of the hole, the pipe being connected to a port of the skirt that opens out between the sealing rings.

8. The undercarriage according to claim 5, wherein the pipe is held along an inside wall of the inner cylinder by means of an annular support fitted against the inside wall of the inner cylinder and including a passage configured to receive the pipe.

\* \* \* \* \*